April 5, 1938.  C. DOERING  2,113,081
RECEPTACLE FILLING MACHINE
Filed March 25, 1936  3 Sheets-Sheet 1

Inventor
Charles Doering
BY
Harry C. Liebritz
Attorney.

April 5, 1938.  C. DOERING  2,113,081
RECEPTACLE FILLING MACHINE
Filed March 25, 1936  3 Sheets-Sheet 2

Inventor
Charles Doering
BY
Harry C. Lewis
Attorney.

April 5, 1938.  C. DOERING  2,113,081
RECEPTACLE FILLING MACHINE
Filed March 25, 1936   3 Sheets-Sheet 3
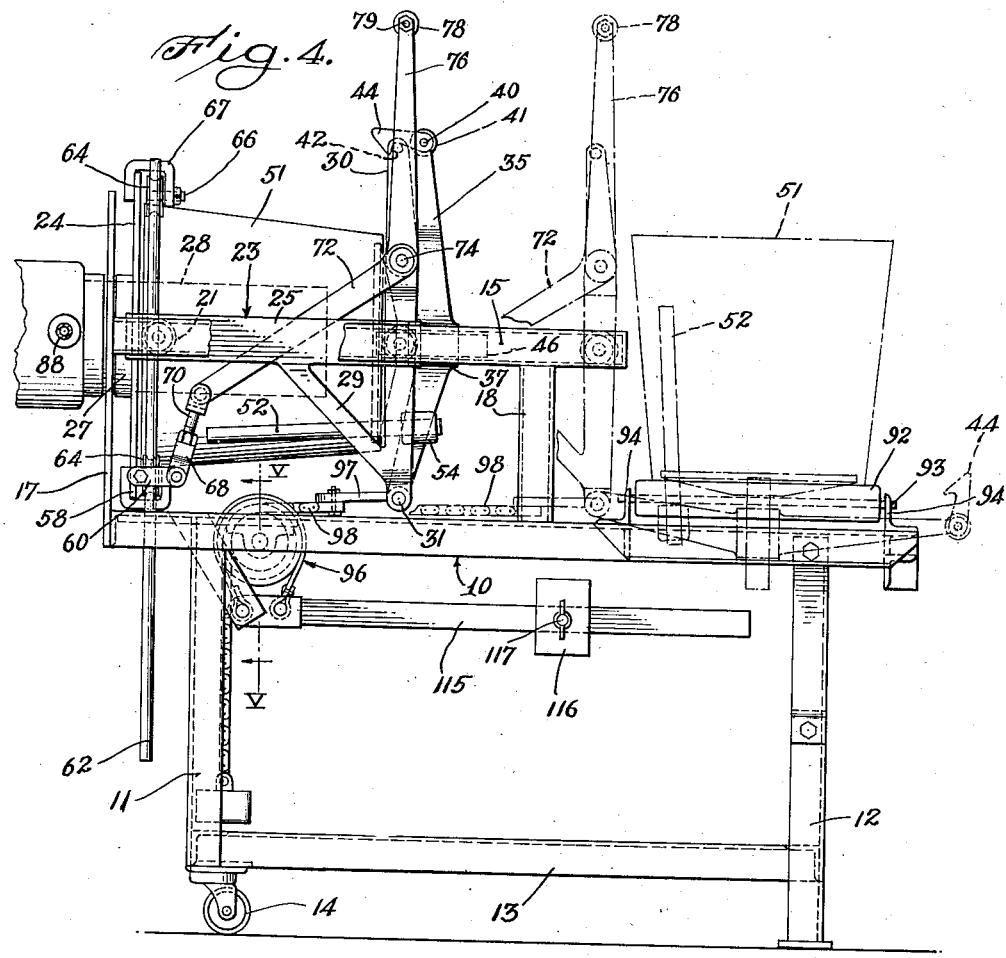
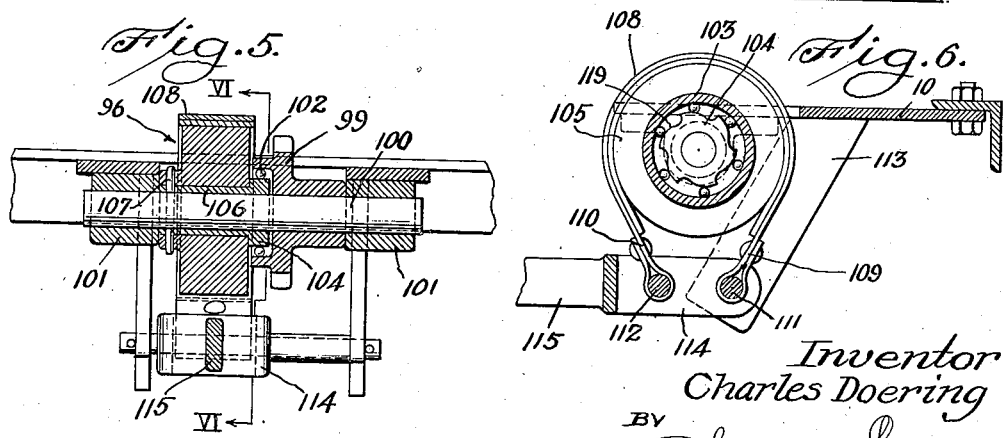
Inventor
Charles Doering
BY
Harry C. Roberts
Attorney.

Patented Apr. 5, 1938

2,113,081

UNITED STATES PATENT OFFICE 2,113,081

RECEPTACLE FILLING MACHINE

Charles Doering, Chicago, Ill., assignor of one-half to Henry Doering, Chicago, Ill.

Application March 25, 1936, Serial No. 70,789

12 Claims. (Cl. 226—24)

This invention relates to receptacle filling machines and more particularly to machines for filling containers with dairy substances, although certain features thereof may be employed with equal advantage for other purposes.

It contemplates more especially the provision of improved means for filling tubs with butter or similar dairy substances so as to effect the packaging thereof with utmost sanitation and without entailing much time or labor.

Heretofore it has been the practice to largely depend upon hand filling of tubs with butter and similar dairy substances. This involves appreciable manual labor, time, and is not conducive to the desired sanitation which is a requisite with edible products. While machines have been heretofore proposed for filling tubs with edible plastic substances, yet these have not proven entirely satisfactory for the purpose in that plastic substances are readily densified responsive to handling and are otherwise impaired both from an appearance as well as texture standpoint when subjected to handling in a manner that is not conducive to uniform treatment.

It is imperative, therefore, that edible substances such as butter, lard, and similar plastics be subjected to uniform handling in order to control their density and to avoid any impairment to the homogeneity of the constituent substances throughout their mass.

One object of the present invention is to simplify and improve the construction of machines of the character mentioned.

Another object is to provide improved means for filling tubs or other receptacles with edible plastic substances so as to effect the confinement thereof with utmost sanitation and without entailing any appreciable time or labor.

Still another object is to provide means for filling receptacles with plastic substances so as to confine such with uniform density and without impairment to the density thereof.

A further object is to provide means for filling receptacles with edible substances at a predetermined density without requiring skilled supervision, handling, or entailing much time.

A still further object is to provide a tub filling device that discharges edible plastic substances within the confines thereof at a predetermined density and without impairment to the texture thereof.

Still a further object is to provide means for filling receptacles with edible plastic substances with the utmost sanitation, uniformity in texture, and in predetermined quantities so that the successive receptacles will be uniform, sightly in appearance and completely sanitary.

Other objects and advantages will appear from the following illustrative description of a preferred embodiment of the present invention.

In the drawings:

Figure 4 is a side view in elevation of the machine shown in Figure 1 with parts thereof shown in section and the extreme positions of the parts shown in dotted outline to clarify the showing.

Figure 5 is a sectional view in elevation of a braking device taken substantially along line V—V of Figure 4.

Figure 6 is a sectional view taken substantially along line VI—VI of Figure 5.

Figure 1:
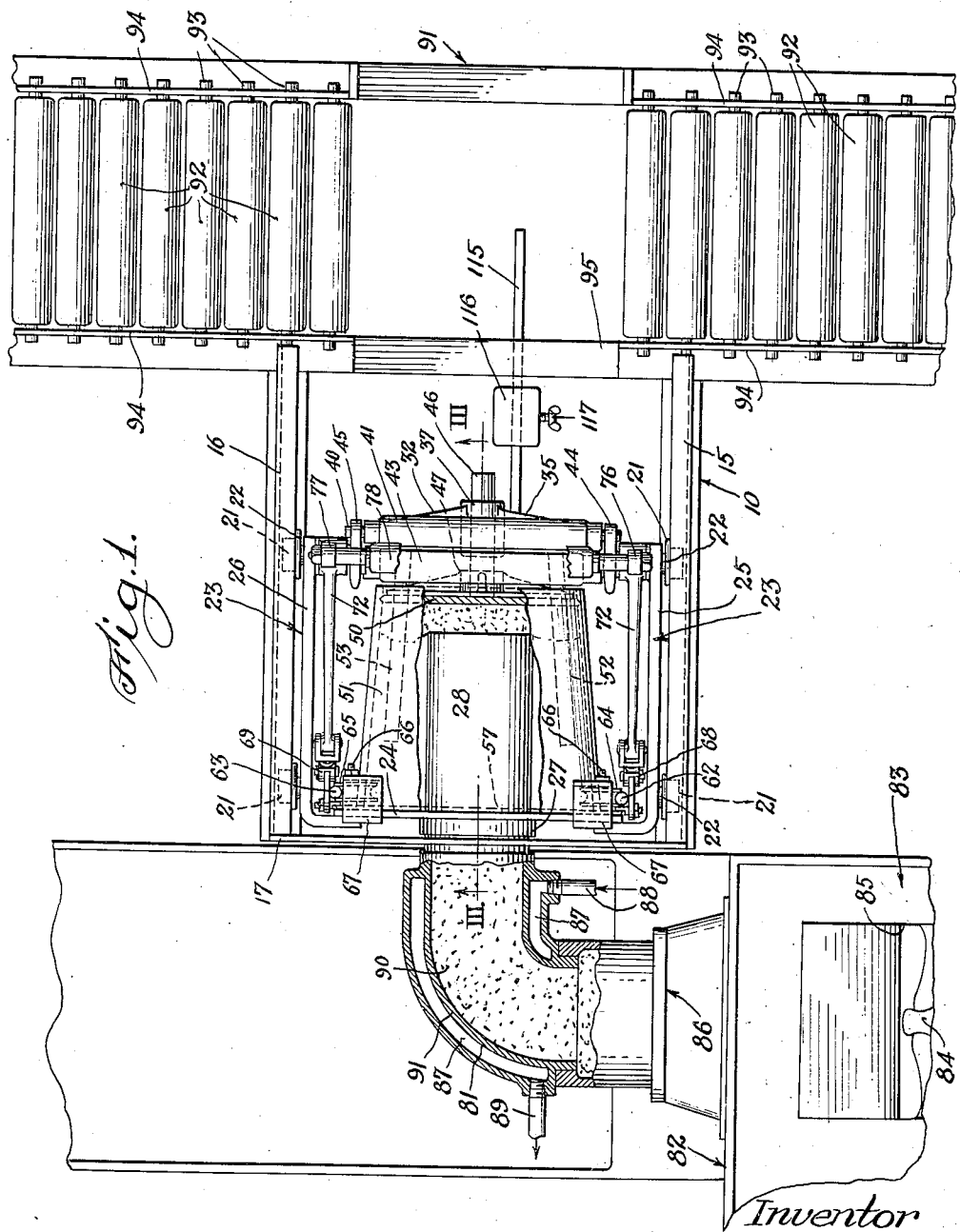
Figure 1 is a plan view in elevation of a device embodying features of the present invention, parts thereof being shown in section to clarify the showing.

The structure selected for illustration comprises a frame 10 constructed from any suitable material such as angle iron to present a substantially rectangular unit supported at the desired elevation by forward and rearward corner supports 11 and 12. Cross members comprising angle bars 13 maintain the corner standards 11 and 12 in spaced parallelism and serve to rigidify the frame unit 10 as a self-sustaining support for instrumentalities to be described hereinafter. The frame standards 11 are preferably, though not essentially, provided with casters 14 that cooperate with the extremities of the rearward standards 12 to sustain the frame 10 in a horizontal plane. The forward standards 11 with the casters 14 enable the convenient movement of the frame 10 with its instrumentalities to any desired location.

The frame 10 has horizontally disposed bars 15 and 16 disposed thereon for support in spaced parallelism with the longitudinal bar members of frame 10, these being supported at their forward extremities by a plate 17 with struts 18 serving as supports proximate to the rear extremities thereof to maintain the bars 15 and 16 at the desired elevation with respect to the frame 10. The guide bars 15 and 16 have flanges 19 and 20 along the longitudinal edges thereof to present a substantially U-shaped cross-section in confronting relation with each other to define guide rails for flanged wheels 21. The flange wheels 21, in this instance four, are journalled on axles 22 anchored in a substantially rectangular carriage 23 sized in width to be somewhat narrower than the space between the confronting guide rails 15 and 16 to permit the flange wheels 21 to be interposed therebetween as a complement to the confronting surfaces of the rails 15 and 16.

These sustain the carriage 23 for displacement along the rails 15 and 16 within the limits of their length for a purpose that will appear more fully hereinafter. As shown, the carriage 23 has a forward plate 24 which is fixed to the side members 25 and 26 thereof, to present an axial circular flange 27 defining an opening to freely receive the cylindrical discharge spout 28 therethrough. The discharge spout 28 is connected to a substance treating device which will be described more fully hereinafter, but which forms no part of the present invention except as an element utilized in connection therewith.

Now, then, the side rails of the carriage 23 have bracket arms 29 and 30 fixed thereto intermediate the length thereof to sustain a receptacle support. To this end, the bracket arms 29 and 30 carry a pintle 31 projecting through their lower extremities to pivotally sustain a receptacle sustaining bracket 32 having axially intersecting arms 33, 34, 35 and 36 integrally or otherwise connected by a central boss 37. It will be observed that the lower radial arms 33 and 34 have enlarged bosses 38 and 39, respectively, at their lower extremity for pivotal connection to the pintle 30 so that the bracket 32 may be pivoted relative thereto. The upper intersecting brackets 35 and 36 are connected by a pintle 40 which has a roller 41 journalled between the arms 35 and 36 to serve as an axle member for pivotal manipulating and displacing the receptacle sustaining bracket 32.

The carriage bracket arms 29 and 30 are connected at their upper extremities by a rod 42 having a roller 43 interposed therebetween to cooperate with latches 44 and 45 pivotally mounted on the pintle 40 outside of the arms 35 and 36 of the bracket 32, the latches 44 and 45 being shaped to engage the roller 43 supported by the arms 29 and 30 to normally maintain the receptacle sustaining bracket 32 in a vertical plane. The axial boss 37 of the bracket 32 is provided with a bore to receive a stub shaft 46 comprising a part of the circular platform 47 that is attached to the reduced extremity 48 thereof. A set screw or other suitable fastening expedient 49 extends through the boss 37 to detachably connect the platform thereto.

Figure 2:
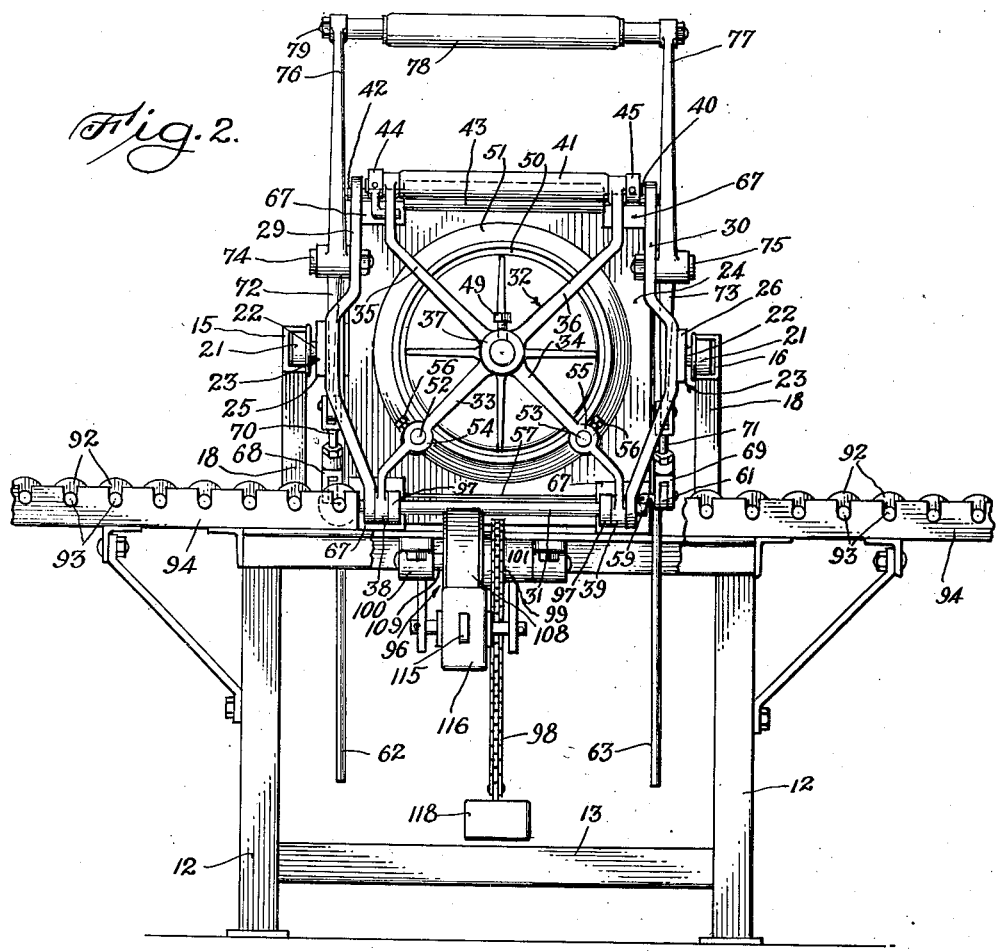
Figure 2 is a front view in elevation of the device shown in Figure 1.
Figure 3:
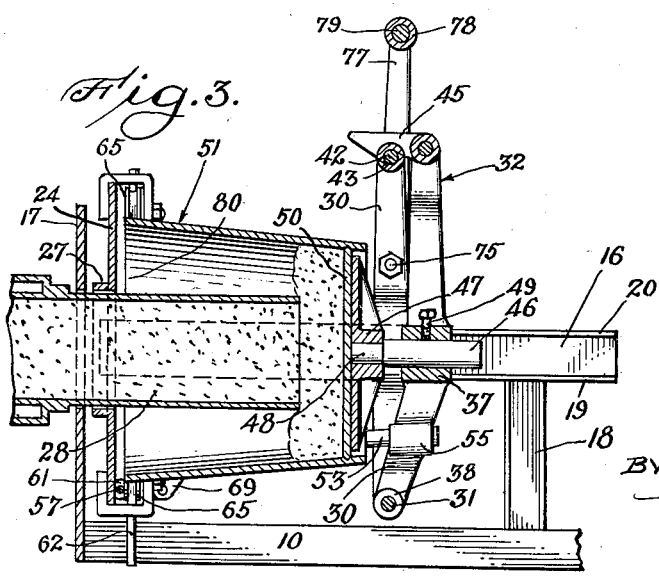
Figure 3 is a sectional view taken substantially along line III—III of Figure 1.

The platform 47 is, in this instance, designed to adapt itself to a base 50 of the receptacle 51 which preferably though not essentially comprises an open tub, although its shape and size may be varied within a wide range depending upon the dictates of commercial practice and the uses for which the filling machine is desired. The receptacle 51 is sustained by the base platform 47 in conjunction with rods 52 and 53 which extend through bosses 54 and 55 in the radial arms 33 and 34, respectively, (Figures 2, 3 and 4). The supporting rods 52 and 53 are held in the bosses 54 and 55 by means of set screws 56 so as to sustain the receptacle 51 in a horizontal position in conjunction with the base platform 47 for movement with the pivotally mounted supporting bracket 32 having a handle 41 for its displacement about the pintle 31. This is possible when the latches 44 and 45 are disconnected from the roller 43 by displacement in a clockwise direction (Figure 4).

In order to separate the substance within the interior of the container 51 when filled from the source of supply through the discharge spout 28, a severing wire 57 is tensioned between threaded studs 58 and 59 anchored in plates 60 and 61 which are attached to vertically extended rods 62 and 63. The rods 62 and 63 are guided for movement on vertically aligned sheaves 64 and 65 journalled on axles 66 carried by brackets 67, in this instance four, fixed to the corners of the forward plate 24 of the carriage 23. In consequence thereof, the cutting wire 57 is tensioned between the plates 60 and 61 forwardly of the sheaves 64 and 65 and rearwardly adjacent the forward plate 24 of the carriage 23.

The severing wire 57 is elevated with the rods 62 and 63 that serve as a guide therefor over the sheaves 64 and 65, by means of links 68 and 69 pivotally connected to the wire carrying plates 60 and 61. The links 68 and 69 are adjustably connected to rods 70 and 71 that have furcated extremities which serve to afford pivotal attachment to the lever arms 72 and 73 pivoted as at 74 and 75 to the vertical bracket arms 29 and 30 of the carriage 23. The inclined lever arms 72 and 73 extend upwardly beyond the pivots 74 and 75 in a vertical direction to provide arms 76 and 77 formed integrally therewith. The arms 76 and 77 extend upwardly beyond the roller 41 of the receptacle supporting bracket 32 to present a handle 78 rotatably mounted upon a pintle 79 that bridges the arms 76 and 77 to maintain them in rigid spaced relation.

It will be observed, therefore, that the rotation of the lever arms 76 and 77 responsive to the displacement of the handle 78 in a clockwise direction (viewed from Figure 4) will lift the severing wire 57 across the open mouth or peripheral edge 80 of the open tub or other receptacle 51 to sever the substances confined therein from the source of supply which is provided through the discharge spout 28 connected to a conditioning housing 81 of any suitable treating machine 82.

The treating machine 82 may comprise a housing 83 having a spiral or other type of conveyor 84 therein for receiving the butter or other edible substances through an opening 85 in the machine housing 83. The edible substance is fed along a predetermined path within the housing 83 by the operation of the conveyor 84 to extrude such through the constricted opening or discharge throat 86 formed in the end of the feeding housing 83. The conditioning housing 83 that connects with the constricted throat 86 of the feeding machine 82 is preferably provided with chambered walls 87 which define a jacket for receiving a tempering fluid circulated therethrough by means of a pressure flow into pipe 88 and out of pipe 89, although the flow may be interrupted for temperature control or reversed in direction.

Any suitable tempering fluid such as steam, water or a refrigerant may be circulated through the jacket 87 of the conditioning housing 83 for discharging edible substances 90 at the proper consistency from the treatment machine 82 to the discharge spout 28 that is normally within the receptacle 51 when the carriage 23 is in its initial forward position. The feeding of the edible substances 90 forces the receptacle 51 together with its carriage 23 rearwardly or to the right (as shown in Figures 1, 3, and 4) until filled up to its open mouth edge 80. Thereupon, the handle 78 is displaced in a clockwise direction (viewed from Figures 3 and 4) to elevate the severing wire 57 to separate the substances 90 within the receptacle 51 from the substances within the conditioning housing 81.

At this moment the feeding machine may be rendered inactive and after the separation has been effected, the latches 44 and 45 of the receptacle sustaining bracket 32 are rotated in a clockwise direction (viewed from Figures 3 and 4) to enable the handle 41 to be manipulated for displacement of the entire bracket 32 in a clockwise direction (viewed from Figures 3 and 4) so as to move the receptacle 51 therewith to a vertical upright position (shown in dotted outline in Figure 4). Thereupon the filled receptacle 51 is placed upon a conveyor frame 91 that is preferably, though not essentially, attached to the terminals of the guide rails 15 and 16 (Figure 1) to afford displacement of the filled receptacle 51 over a series of closely spaced conveyor rollers 92 that are carried by the rods 93 journalled in angle bars 94 fixed to the frame 91 on both sides of a supporting area 95 sized and positioned to receive the receptacle sustaining bracket 32 when it is displaced in a clockwise direction (viewed from Figures 3 and 4) to a horizontal plane (shown in dotted outline in Figure 4).

In order that the edible substances 90 may be supplied to the interior of the container or receptacle 51 at a predetermined or selected density and to preclude the free movement of the carriage 23 which must be controlled, a braking mechanism 96 is provided for that purpose. The braking mechanism comprises, in this instance, a link 97 attached to the pintle 31 (Figure 4) which bridges the lower extremities of the carriage arms 29 and 30. The link 97 has its other extremity attached to a chain 98 that is in meshing engagement with a gear 99 journalled on a shaft 100. The shaft 100 is supported by spaced bearing brackets 101 fixed to the frame 10 (Figure 5).

As shown, the gear 99 has a peripheral flange 102 extending laterally from the face thereof to cooperate with ball bearings 103 comprising a part of a clutch which has a stationary cooperating element 104 fixed to the shaft 100. A brake element 105 is concentrically fixed to a cylindrical shaft engaging portion 106 of the weight element 104, and these are held fast to the shaft 100 through a pin 107 extending radially therethrough. A frictional brake band 108 envelops the brake element 105, and the extremities 109 and 110 are attached to rods 111 and 112, respectively. The rod 111 bridges depending struts 113 fixed to the frame 10 while the rod 112 is carried by the extremity 114 of a bar 115. The bar 115 is pivoted about the rod 111 through the extremity 114 thereof so that the normal clockwise gravity urge of the bar 115 (viewed from Figure 4) tensions the flexible brake band 96 to frictionally grasp the peripheral surface of the brake element 105. A weight 116 is carried by the bar 115 for displacement therealong, it having a flanged stud 117 projecting therethrough to engage the bar 115 so that the weight may be held in its adjusted position therealong.

It will be apparent, therefore, that the tensioning of the flexible brake band 96 and its frictional grasp of the brake element 105 may be varied within a wide range depending upon the position of the weight 116 relative to the pivotal support 111 and the brake bar 115. The chain 98 also has a weight 118 fixed to the extremity thereof so that it will be in meshing engagement with the gear 99 so that the ball bearings 103 confined therein will cooperate with a peripheral series of curved teeth 119 provided in the clutch element 104 so that the brake element 105 will rotate with the gear 99 relative to the brake band 108 when the carriage 23 is displaced rearwardly (toward the right viewed from Figure 4) against the frictional reaction between the brake element 105 and its flexible band 108. In bringing the carriage 23 to its initial forward position (toward the left viewed from Figure 4) the ball bearings 103 will become lodged in the troughs of the teeth 119 on the clutch element 104 to permit its displacement without the effect of brake elements 105—108 and disconnect such entirely so far as movement of the carriage 23 is effected toward the forward plate 17 of the frame 10.

It will be apparent, therefore, that the edible substances are discharged through the spout 28 to the interior of the receptacle 51 for application against the bottom thereof to displace it toward the right or rearwardly against the resistance offered by the brake elements 105—108. The resistance may be adjusted within a wide range depending upon the position of the weight 116 along the brake bar 115. This determines the density at which the edible substances 90 are packed within the container 51 until it is completely filled. Obviously, this will require the carriage 23 to be displaced to its extreme position adjacent the conveyor 91. When the carriage 23 arrives at its extreme position coincident with a completely filled container 51, as designated, automatic means may be provided for rendering inactive any further feeding operation of the edible substances from the treatment machine 82.

Then, too, the severing wire 57 is elevated by actuating the lever instrumentalities operatively connected therewith, and the tub or receptacle 51 is, thereupon, rotated in a clockwise direction with its open mouth vertically upward for displacement along the conveyor frame 91 with the aid of the rollers 92 journalled thereon. Another empty receptacle is brought into position by displacement over the rollers 92 so as to easily and expeditiously effect its mounting upon the receptacle sustaining bracket 32. This operation is repeated and the container is filled with any predetermined quantity depending upon the size of the container, its shape and the density at which the substance is packed therein which is a factor of the resistance afforded by the adjustable brake elements 105—108.

It should be appreciated that in the filling of receptacles in the manner described with the teachings of the present invention, voids in the packed substance are entirely eliminated to the extent of precluding the accumulation of water and air. This is undesirable in that edible products deteriorate much more readily with voids therein and such is not conducive to a uniform and homogeneous product. Then, too, with a device of this character, the receptacles can be packed immediately after the substances are treated or chilled so as to render them available for the market without any delay and in the freshest possible condition. This is conducive to a much more satisfactory product and minimizes the expense of handling. Production is increased and the resulting product together with the packaging thereof is much more uniform and satisfactory from every possible standpoint.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a container packing device, the combination with a movable carrier, of pivotal means on said carrier for supporting a container for movement along a predetermined path, means for discharging substances into a container supported by said carrier while being displaced by the force of substance discharge, and means for prescribing a measured amount of substance discharge for confinement in said container, adjustable latch means for normally maintaining said pivotal means in operative filling position, and means for releasing said latch means and pivotally displacing said container supporting means with the filled container thereon.

2. In a container packing device, the combination with a frame, of a carrier movable along said frame, pivotal means on said carrier for supporting a container for movement along a predetermined path, means for discharging substances into said container while being displaced by the force of substance discharge, means for severing the container confined substance from said discharge means, and means for varying the angular position of said pivotal container supporting means.

3. In a container packing device, the combination with a frame, of a carrier reciprocably mounted in said frame, means for supporting a container for movement along a predetermined path with said carrier, means for discharging substances into said container while being displaced by the force of substance discharge, braking means for retarding the movement of said container supporting means to regulate the density of the container filled substance, means for severing the container confined substance from said discharge means, and means for displacing said container supporting means relative to said carrier to remove the filled container from said predetermined path of carrier movement.

4. In a container packing device, the combination with a frame, of a carrier reciprocably mounted on said frame, means adjustably associated with said carrier for supporting a container for movement along a predetermined path, means for discharging substances into said container while being displaced by the force of substance discharge, braking means for retarding the movement of said container supporting means to regulate the density of the container filled substance, means for severing the container confined substance from said discharge means at a predetermined position of container displacement, and means for displacing said container supporting means relative to said carrier to remove the filled container from said predetermined path of carrier movement.

5. In a container packing device, the combination with a frame, of a carrier reciprocably mounted on said frame, tiltable means on said carrier for supporting a container for movement along a predetermined path, means for discharging substances into said container while being displaced by the force of substance discharge, braking means for retarding the movement of said container supporting means to regulate the density of the container filled substance, clutch means for releasing said braking means in returning said container supporting means to initial position, means for severing the container confined substance from said discharge means at a predetermined position of container displacement, and means for actuating said tiltable container supporting means relative to said carrier.

6. In a container packing device, the combination with a frame, of a carrier reciprocably mounted on said frame, means rockably mounted on said carrier for supporting a container for movement along a predetermined path, means for discharging substances into said container while being displaced by the force of substance discharge, means for severing the container confined substance from said discharge means, latch means for holding said rockably mounted container supporting means in a predetermined position relative to said carrier, and means for releasing said latch means and tilting said container supporting means relative to said carrier subsequent to the operation of said severing means.

7. In a container packing device, the combination with a frame, of a carrier reciprocably mounted on said frame, means rockably mounted on said carrier for supporting a container for movement along a predetermined path, of means for discharging substances into said container while being displaced by the force of substance discharge, means for severing the container confined substance from said discharge means, latch means for holding said rockably mounted container supporting means in a predetermined position relative to said carrier, braking means for retarding the movement of said container supporting means to regulate the density of the container filled substance, and means for releasing said latch means and tilting said container supporting means relative to said carrier subsequent to the operation of said severing means.

8. In a container packing device, the combination with a frame, of a carrier reciprocably mounted on said frame, means rockably mounted on said carrier for supporting a container for movement along a predetermined path, of means for discharging substances into said container while being displaced by the force of substance discharge, means for severing the container confined substance from said discharge means, latch means for holding said rockably mounted container supporting means in a predetermined position relative to said carrier, adjustable braking means for retarding the movement of said container supporting means to regulate the density of the container filled substance, and means for releasing said latch means and tilting said container supporting means relative to said carrier subsequent to the operation of said severing means.

9. In a device of the character described, the combination with a frame, of a carriage mounted for displacement along said frame, a member pivoted to said carriage to support a container, of substance discharging means in the path of said container supporting carriage, severing means mounted for displacement across the opening of the container when positioned for receiving substances from said discharge means, means for operating said severing means when said container supporting carriage has been displaced by the substance issuing from said discharging means, and means for changing the angular position of said pivoted container supporting member subsequent to operating said severing means.

10. In a device of the character described, the combination with a frame, of a carriage mounted for displacement along said frame, a member pivoted to said carriage to support a container, of substance discharging means in the path of said container supporting carriage, braking means for retarding the movement of said carriage to regulate the density of the container filled substance, severing means mounted for displacement across the opening of said container when positioned for receiving the substances from said discharge means, means for operating said severing means when said container supporting carriage has been displaced by the substance issuing from said discharging means, and means for changing the angular position of said pivoted container supporting member subsequent to operating said severing means.

11. In a device of the character described, the combination with a frame, of a carriage mounted for displacement along said frame, a member pivoted to said carriage to support a container, of substance discharging means in the path of said container supporting carriage, braking means for retarding the movement of said carriage to regulate the density of the container filled substance, clutch means for releasing said braking means in returning said carriage to initial position, severing means mounted for displacement across the opening of said container when positioned for receiving the substances from said discharge means, means for operating said severing means when said container supporting carriage has been displaced by the substance issuing from said discharging means, and means for changing the angular position of said pivoted container supporting member subsequent to operating said severing means.

12. In a device of the character described, the combination with a frame, of a carriage mounted for displacement along said frame, a member pivoted to said carriage to support a container, of substance discharging means in the path of said container supporting carriage, adjustable braking means for retarding the movement of said carriage to regulate the density of said container filled substance, clutch means for releasing said braking means in returning said carriage to initial positioning, severing means mounted for displacement across the opening of said container when positioned for receiving the substances from said discharge means, means for operating said severing means when said container supporting carriage has been displaced by the substance issuing from said discharging means, and means for changing the angular position of said pivoted container supporting member subsequent to operating said severing means.

CHARLES DOERING.